Oct. 30, 1962 H. C. HANSEN 3,061,746
ELECTRIC MOTORS
Filed Sept. 28, 1959 2 Sheets-Sheet 1

INVENTOR.
HANS CHRISTIAN HANSEN
BY Dicke, Craig & Freudenberg
ATTORNEYS

Oct. 30, 1962 H. C. HANSEN 3,061,746
ELECTRIC MOTORS
Filed Sept. 28, 1959 2 Sheets-Sheet 2

INVENTOR.
HANS CHRISTIAN HANSEN
BY Dicke, Craig & Freudenberg
ATTORNEYS

United States Patent Office 3,061,746
Patented Oct. 30, 1962

3,061,746
ELECTRIC MOTORS
Hans Christian Hansen, Christiansholmsvej 14,
Klampenborg, Copenhagen, Denmark
Filed Sept. 28, 1959, Ser. No. 842,784
Claims priority, application Great Britain Sept. 29, 1958
13 Claims. (Cl. 310—90)

The present invention relates to electric motors and more specifically to small electric motors such as used in electrical phonographs.

It is an object of the invention to provide a motor structure which can easily be adjusted to run with a predetermined desired speed within a certain range of speed variations.

It is another object of the invention to provide an electric motor having a stator with a plurality of poles surrounding an aperture or tunnel for receiving a rotor and an auxiliary pole shoe structure having spaced pole pieces of magnetizable material arranged between the stator pole surfaces and the rotor capable of being turned relatively to the stator poles to influence the parts of the magnetic flux between the poles and the rotor for thereby regulating the speed of the motor to a predetermined number of revolutions per minute within certain limits.

Figure 1:
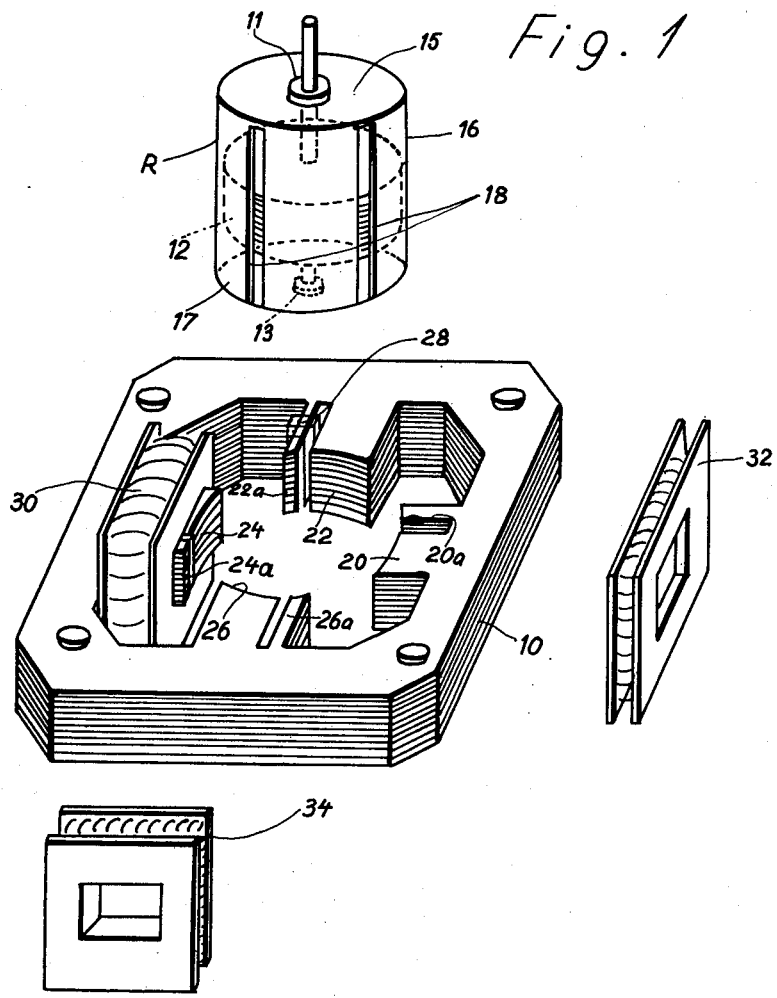
Figure 2:
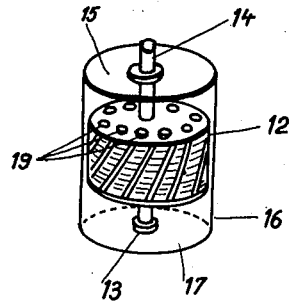
Figure 3:
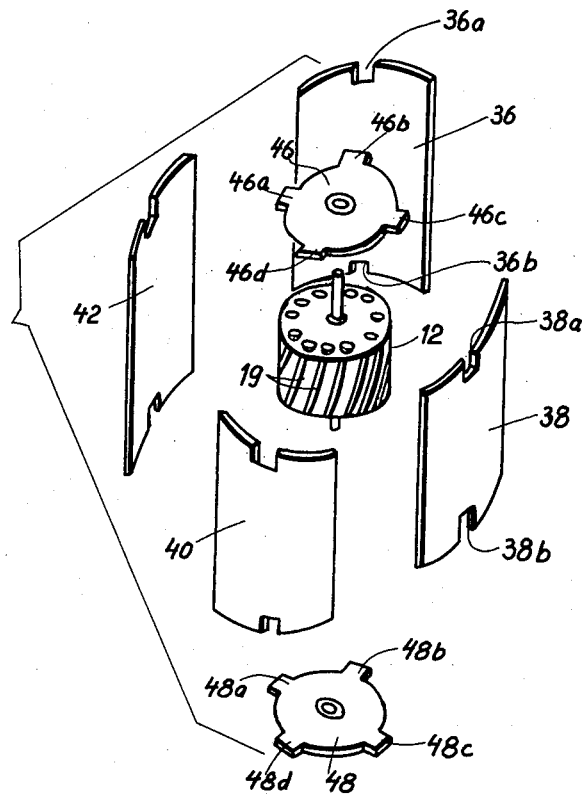

Further objects and advantages of my invention will appear from the following specification with reference to the accompanying drawings, in which FIGURE 1 is an exploded, perspective view of the essential parts of a motor according to the invention, FIGURE 2 is a perspective view of the rotor structure and FIGURE 3 is an exploded, perspective view of another embodiment of the rotor structure.

In broad terms the electric motor according to my invention comprises a rotor 12 and a stator package 10 having a plurality of pole members with inwardly facing arcuate surfaces defining an aperture or tunnel. Each pole member includes means for acting with a starting torque on the rotor 12. In the motor I provide an assembly comprising a hollow structure exemplified by the cylinder 16 in FIGURE 1 and means exemplified by end pieces 15 and 17 with bearings 11 and 13 for receiving and centering the rotor concentrically within the hollow structure. The structure 16 is inserted in the stator package in frictional engagement therewith. The cylindrical structure can be turned relatively to the stator poles. Means are provided exemplified by slots in the cylinder 16 operable in response to such turning of the cylinder to regulate the magnetic flux between the stator pole members and the rotor. Hereby the speed of the motor can be regulated within certain limits.

As it will be appreciated my invention provides for an auxiliary pole shoe structure of magnetizable material arranged to be turned with its exterior surface in engagement with the inwardly facing surfaces of the stator structure. By such turning the auxiliary pole shoes can be adjustably extended in peripheral direction over a variable surface portion of each of the poles of the stator.

The invention further provides the combination of such auxiliary pole shoe structure with a unitary rotor assembly or alternatively such unitary rotor assembly without the necessity of utilizing its advantages to regulate the speed of the motor though I prefer to design the motor to obtain all the advantages simultaneously.

Accordingly in one aspect of my invention I provide an auxiliary pole shoe structure having a plurality of pole shoe pieces such as exemplified by portions of the cylinder of FIGURE 1 between the slots 18 or the arcuate members shown in FIGURE 3. Said pole pieces are adjustably arranged in the peripheral direction relatively to the interior facing surfaces of the peripherally distributed poles of the stator structure 10 whereby the pole shoe pieces can be slightly turned relatively to the pole surfaces so as to cause desired adjustment of the magnetic flux between the stator poles and the armature or rotor to respond to a predetermined speed or number of revolutions per minute of the motor.

The motor according to my invention comprises from one aspect a rotor structure R in which a rotor 12 is centered adequately relatively to an exterior tubular member by bearings 11 and 13 associated with end pieces 15 and 17 for the tubular member. This unitary rotor structure is positioned in the stator with the tubular member in engagement with the pole surfaces of the stator 10. At least one of the end pieces is of a diameter equal to or less than the exterior diameter of the tubular member 16 so as to allow the tubular member to be inserted into the stator from one end.

According to a preferred embodiment the tubular member has longitudinal slots 18 whereby the magnetic flux divided between the main poles and auxiliary poles, having starter windings, of the stator can be regulated or adjusted to respond to a desired speed of the motor.

Seen from a different aspect my invention provides for an adjustable pole structure comprising the arcuate portions of the cylindrical member 16 between the slots 18 positioned in engagement with main poles and auxiliary starter poles of the stator and adjustable relatively thereto by being turned for regulating the magnetic flux to respond to the desired motor speed.

When seen from this aspect the auxiliary pole structure may also be used to define a unitary rotor structure.

The motor illustrated has a stator lamination stack 10 with an aperture or tunnel for receiving the rotor subtended by a plurality of stator poles, 20, 22, 24 and 26, e.g. four as shown in the embodiment each of which is divided in a main pole portion and an auxiliary pole portion 20a, 22a, 24a, and 26a, the latter being provided with a short-circuited coil 28 as shown on the auxiliary pole 22a only having one or a few windings to cause the auxiliary poles to act upon the armature with the necessary starting torque. As apparent from FIGURE 1 the pole structure provides a plurality of inwardly facing surfaces defining an aperture or tunnel of substantially cylindrical exterior confines.

Each pole is provided with a stator coil of which one referred to by 30 is shown positioned on the pole structure 24, 24a while two others, referred to by 32 and 34 are shown exploded. Each stator coil is preferably wound on an insulating body preferably of a synthetic resinous material.

It will be understood that the design of the stator structure can within the scope of the invention vary considerably from the embodiment illustrated with respect to the extension of the pole shoes, the number of poles and the arrangement of the auxiliary poles for providing the starting torque.

The rotor structure comprises, as shown in FIGURE 2, a rotor 12 having a rotor lamination stack mounted on a rotor shaft 14 with a plurality of rods 19 of copper or an equivalent material extending between the opposite surfaces of the rotor lamination stack and secured in a well known manner.

The rotor with the shaft 14 is in the form of a subassembly mounted in a tubular member 16 the ends of which are provided with closure members 15 and 17 including bearings 11 and 13 for the shaft 14.

In FIGURE 2 no longitudinal slots of the tubular member are shown. My invention provides for two different aspects, i.e. one aspect according to which the tubular structure 16 which also may be referred to as a shell body is designed to form auxiliary pole shoes in physical contact with the interior surfaces of the stator poles. In such event the cylindrical member 16 must be of magnetizable material in order to obtain the effect as will appear from the following. For the same reason in order to avoid magnetical short-circuiting through the end pieces 15 and 17 the latter should be of non-magnetizable material.

According to a modification or different aspect of my invention the same provides for a unitary self-contained rotor assembly not necessarily contributing to regulation of the motor aspect and in such event the cylindrical structure 16 may be a non-slotted cylinder of any non-magnetizable material. When, seen from this aspect, it is important that at least one of the end pieces 15 or 17 does not extend beyond the exterior confines of the cylinder 16 so as not to obstruct insertion of the rotor subassembly into the stator tunnel from one end thereof.

The tubular member 16 of the rotor structure fits in the aperture in the stator lamination 10. It will be understood that since the rotor shaft bearings 11 and 13 are provided in the closure members 15 and 17 the rotor is automatically correctly centered with respect to the tubular member 16, the air gap between the rotor 12 and this member 16 being defined by the annular space between the interior of the tubular member and the exterior of the rotor.

It will be appreciated that this structure provides for a reduction of the air gap in comparison with a traditional motor in which the bearings are provided in bridge members or the like secured to the stator lamination stack.

The tubular member 16 is preferably of a magnetizable material so that when the rotor structure with the tubular member 16 is mounted in the stator lamination stack 10 with the tubular member in physical contact with the pole surfaces of the stator the zones of the tubular member in its orbit of contact with the poles of the stator will constitute pole shoes.

As shown in FIGURE 1 the exterior tubular member 16 is provided with vertically extending slots 18 peripherally spaced in such a manner that when the rotor structure is mounted in the stator structure each slot may be in position to substantially align with the slots between the main poles 20, 22, 24, 26 and the surfaces of the auxiliary poles 20a, 22a, 24a, 26a provided with the starter windings.

This not only causes a separation of the magnetic field from the main poles and the auxiliary starter poles, but by turning the entire rotor structure 16, 18 relatively to the stator 10, the slots 18 in the tubular member can be slightly displaced relatively to the slots between the two poles, or seen from another aspect the edge orbit of the tubular member adjacent the slots 18 can be caused to extend more or less over the air gap between the main pole surface and the starter pole surface and thereby influence the path of the magnetic flux between the main poles and the auxiliary poles on one side and the rotor on the other side.

I have found that hereby I have suitable means for regulating the speed of the motor to a predetermined number of revolutions per minute within certain limits. When using the motor according to my invention as a driving motor for the phonograph turntable I have found that all minor irregularities in the manufacture which would result in either undesired difference in phonograph turntable speed or include the necessity of delicate adjustments can be attended to by a minor turning of the rotor or pole shoe structure. Seen from another aspect my invention may enable production of phonograph motors with reduced requirements with respect to such tolerances which govern the speed of the motor whereby a cheaper motor can be manufactured.

Seen from this aspect my invention provides a structure of an electric motor having auxiliary stator pole structures adjacent the main pole structures and an auxiliary pole shoe structure having pole pieces adjustably arranged peripherally relatively to the surface of the stator poles to cause desired adjustment of the magnetic flux to the armature to respond to a predetermined speed of the motor.

The rotor structure may, as shown in FIGURE 1, include an exterior tube 16 slotted along a part of its length and a pair of disc members 15 and 17 arranged to close the end of the tube and each having a bearing 11 and 13 for the rotor shaft.

The exterior tubular member of the unitary structure may, however, within the scope of the invention as illustrated in FIGURE 3 be composed of a plurality of arcuate members 36, 38, 40, 42 defining a structure of general cylindrical configuration and the edges of the members being spaced in peripheral direction to provide the slots in the exterior structure or seen from another aspect the arcuate members which are of magnetizable material are defining auxiliary pole shoes to be arranged in physical contact with the inwardly facing surfaces of the poles of the stator structure.

As illustrated in FIGURE 3 the exterior structure is formed by four arcuate members 36, 38, 40, 42, each having a length of arc slightly less than one fourth of the entire periphery. At each end of each of the arcuate members there is provided a slot referred to by 36a, 36b, 38a, 38b etc. for receiving an extending flap 46a, 46b, 46c or 46d of one end piece 46 arranged at one end and corresponding extending flaps 48a, 48b, 48c or 48d of another end piece arranged at the other end.

According to this embodiment the radial extensions of the projecting flaps of the end pieces are preferably slightly less than the thickness of the arcuate members, at least at one end of the rotor structure so as to allow the rotor structure to pass through the hole in the stator stack without causing obstruction.

At the outside of the rotor structure there may be provided suitable projections such as uppressed ribs on one or a plurality of the arcuate members shown in FIGURE 3, adapted to engage a stationary part of the stator structure and thereby cause correct positioning of the rotor structure with the rotor substantially in alignment with the pole surfaces of the stator to prevent unintended axial displacement of the rotor structure or auxiliary pole structure when mounted in the stator tunnel.

My invention provides for retaining the rotor structure or auxiliary pole structure in frictional engagement with the pole surfaces of the stator, the friction being sufficient to hold the rotor structure in position under normal working conditions, but not enough to prevent slight turning of the rotor structure or auxiliary pole structure for the purpose specified and described. On the other hand it is desired to provide means for preventaxial displacement of the rotor or auxiliary pole structure relatively to the stator in the direction of the stator tunnel, because such axial displacement would bring the rotor out of its alignment with the stator. Such axial displacement may be a result of forces to which the motor is subjected during shipping. Though I have not illustrated any specific means for preventing such axial displacement, it will be understood that such means may be in the form of a stationary pin extending from the stator structure into an annular groove following the periphery of the rotor structure along a part of its length. Since it is a requirement only that one end of the rotor or auxiliary pole shoe structure is confined to within the diameter of the cylindrical member, it is also within the scope of my invention possible to provide extensions at the end pieces of the other end and secure such extensions to the stator, for example by having one of the stator bolts extending through a hole in such extension and providing resilient sleeves above said stator bolt.

It will be appreciated that while in the foregoing description the rotor is in the form of a unitary structure and simultaneously provides for pole piece members adapted to adjust the magnetic flux by being turned relatively to the stator poles, this latter feature may according to the invention be utilized per se without the necessity of supporting the rotor shaft in end piece bearings associated with the pole pieces.

It will further be understood that though I have described the stator being in the form of a structure having main poles and auxiliary poles separated from the main poles by means of an air gap also modifications with respect to the stator structure will be possible within the scope of my invention so as to include other means operable to act on the rotor with a starting torque.

I claim:

1. In an electric motor in combination: a laminated stator package including a plurality of pole structures each comprising a main pole and an auxiliary pole separated from said main pole by means of an air gap, said pole structures having inwardly facing surfaces defining an aperture of substantially cylindrical exterior confines, a unitary rotor structure comprising a motor rotor having a shaft and an exterior shell body of magnetizable material surrounding said rotor defining a hollow cylinder having its exterior surface in frictional engagement with the inwardly facing surfaces of said pole structure of said stator to provide for mutual peripheral displacement of said shell surface and said stator pole structures, a plurality of longitudinal slots extending through said shell body in parallel relationship with said air gaps between said main poles and said auxiliary starter poles, said slots being peripherally distributed to provide for alignment with each of said slots and each of said air gaps, and end piece of unmagnetizable material adjacent each end of said shell body, at least one of said end pieces being at the most of equal diameter than the exterior diameter of said shell body structure to allow the shell body to be inserted in said stator package aperture, a bearing in each of said end members receiving and centering said rotor concentrically with respect to said tubular structure, and means operable to prevent substantial axial displacement of said shell body relatively to said stator package.

2. For regulating the speed of an electric motor having a rotor and a laminated stator package including a plurality of pole structures each comprising a main pole and an auxiliary starter pole separated from said main pole by means of an air gap and in which said pole shoe structure has inwardly facing surfaces defining an aperture of substantially cylindrical exterior confines: an exterior shell body of magnetizable material surrounding said rotor defining a hollow cylinder having its exterior surface in frictional engagement with the inwardly facing surfaces of said pole structure of said stator to provide for mutual peripheral displacement of said shell surface and said stator pole structures, a plurality of longitudinal slots extending through said shell body in parallel relationship with said air gaps between said main poles and said auxiliary starter poles, said slots being peripherally distributed to provide for alignment with each of said slots and each of said air gaps.

3. In an electric motor: a laminated stator package including a plurality of pole structures having inwardly facing arcuate surfaces defining together an aperture of general cylindrical configuration, each pole structure comprising a main pole and an auxiliary starter pole separated from said main pole by means of an air gap, a rotor having a shaft, a pole shoe structure comprising a plurality of arcuate plate members peripherally spaced, means supporting said arcuate members to define together a hollow structure of general cylindrical configuration, said structure being inserted in said stator package with one edge of each of said arcuate members in substantial alignment with one edge of a stator pole and held in position by frictional engagement between said pole surfaces and the exterior surfaces of said arcuate members, said frictional engagement allowing said structure to be turned relatively to said stator poles to enable edge portions of said arcuate pole shoes to extend partially over said air gaps between said main poles and said starter poles, and means for receiving and centering said rotor concentrically with respect to said pole shoe structure.

4. An electric motor having a laminated stator package including a plurality of pole structures each comprising a main pole and an auxiliary starter pole separated from said main pole by means of an air gap and a unitary rotor structure comprising a rotor having a shaft, an exterior longitudinally slotted member of magnetizable material defining a cylindrical shell surrounding said rotor and having its exterior surface in engagement with the inwardly facing surfaces of said pole shoe structure of said stator, the longitudinal slots of said exterior shell member of said rotor structure extending into parallel relationship and peripherally distributed to substantially align with said air gaps between said main poles and said auxiliary starter poles, an end piece of non-magnetizable material adjacent each end of said shell structure, at least one of said end pieces being at the most of equal diameter than the exterior confines of said shell member to allow said member to be inserted in said stator package, and a bearing in each of said end members receiving and centering said rotor concentrically with respect to said shell member.

5. In and for an electric motor having a stator structure including a plurality of pole members each having a main pole and an auxiliary starter pole and in which said pole members define an aperture of cylindrical configuration: an assembly comprising a cylindrical tubular member having an exterior cross-section fitting into the cylindrical aperture of the stator to be in frictional engagement with said pole members enabling turning of said cylindrical member relatively to said pole pieces, slots extending longitudinally of and through said cylindrical member, said slots being distributed peripherally to substantially align one edge of each slot with one edge of each main pole and a motor rotor having a shaft supported for rotation within said tubular member, end members adjacent each end of said tubular member of which at least one is within the exterior confines of said tubular member, and bearings provided in said end members for supporting the rotor shaft and centering said rotor inside said tubular member.

6. In an electric motor having a rotor and a laminated stator package including a plurality of pole structures having inwardly facing arcuate surfaces defining together an aperture of general cylindrical configuration, each pole structure comprising means for acting on said rotor with a starting torque: a rotor assembly comprising a pole shoe structure having a plurality of arcuate plate members, means supporting said arcuate members spaced peripherally to define together a hollow structure of general cylindrical configuration, means for receiving and centering said rotor concentrically with respect to said pole shoe structure and means for holding said pole shoe structure in said stator package in frictional engagement to be turned relatively to said stator poles to vary the extension of each of said arcuate pole shoes over each of said pole structures.

7. In an electric motor having a rotor and laminated stator package including a plurality of pole members having inwardly facing arcuate surfaces defining together an aperture of general cylindrical configuration, each pole member including means for acting with a starting torque on said rotor: a rotor assembly comprising a hollow structure of general cylindrical configuration, means for receiving and centering said rotor concentrically within said hollow structure, said structure being inserted in said stator package and held in position by frictional engagement therewith to allow said structure to be turned relatively to said stator poles, and means associated with said structure and operable in response to turning of said hollow structure to regulate the magnetic flux between said stator pole members and said rotor to regulate the speed of said motor.

8. An electric motor having a stator package including a plurality of poles and a unitary rotor structure comprising a rotor having a shaft, an exterior shell member of cylindrical configuration surrounding said rotor and having its exterior surface in frictional engagement with the inwardly facing surfaces of said poles and means for receiving and centering said rotor essentially concentrically with respect to said shell structure, said centering means being at least at one end of said shell within the exterior confines thereof.

9. In an electric motor having a rotor and a stator package and including a plurality of poles provided with means operable to act on said rotor with a starting torque, the combination comprising a cylindrical structure effectively constituting a plurality of peripherally spaced auxiliary pole shoes adjustably arranged peripherally relatively to said stator poles to regulate the magnetic flux to the armature to respond to a predetermined speed of the motor.

10. An electric motor having a stator package including a plurality of main poles and auxiliary starter pole structures adjacent said main poles, an auxiliary pole shoe structure having pole pieces adjustably arranged peripherally relatively to the surface of said stator poles to cause desired adjustment of the magnetic flux to the armature to respond to a predetermined speed of the motor.

11. A rotor structure for an electric motor having a stator structure with a cylindrical aperture in the form of a self-contained unitary rotor assembly comprising a motor rotor having a rotor shaft, an exterior cylindrical tubular member surrounding said rotor and having an exterior cross-section fitting into the cylindrical aperture of said stator, end members made of non-magnetizable material and adjacent each end of said tubular member of which at least one is disposed essentially within the confines of the cylindrical member, and bearings provided in each of said end members for supporting the rotor shaft and centering the rotor inside said tubular structure.

12. A unitary rotor structure for an electric motor having a stator structure with a cylindrical aperture in the form of a rotor assembly comprising an exterior cylindrical member having an exterior cross-section fitting into the cylindrical aperture of the stator, end members adjacent each end of said tubular structure of which at least one is essentially disposed within the confines of the cylindrical member, and bearings provided in said end members for supporting the rotor shaft and centering the rotor inside said tubular structure.

13. A self-contained subassembly of a unitary rotor structure for an electric motor having a stator structure with a cylindrical aperture, comprising a rotor assembly having a rotor and an exterior cylindrical member of an exterior cross-section fitting into the cylindrical aperture of the stator, and means at both ends of and inside the exterior confines of said cylindrical member for supporting and centering said rotor inside said cylindrical member.

References Cited in the file of this patent

UNITED STATES PATENTS 2,659,831    Lautner _____ Nov. 17, 1953